United States Patent [19]

Miyaji

[11] Patent Number: 5,497,423
[45] Date of Patent: Mar. 5, 1996

[54] METHOD OF IMPLEMENTING ELLIPTIC CURVE CRYPTOSYSTEMS IN DIGITAL SIGNATURES OR VERIFICATION AND PRIVACY COMMUNICATION

[75] Inventor: Atsuko Miyaji, Kawachinagano, Japan

[73] Assignee: Matsushita Electric Industrial Co., Ltd., Osaka, Japan

[21] Appl. No.: 262,146

[22] Filed: Jun. 20, 1994

[30] Foreign Application Priority Data

Jun. 18, 1993 [JP] Japan ................................. 5-147334

[51] Int. Cl.$^6$ .................................................. H04L 9/30
[52] U.S. Cl. ................................. 380/30; 380/28
[58] Field of Search ........................................ 380/28, 30

[56] References Cited

U.S. PATENT DOCUMENTS

| | | | |
|---|---|---|---|
| 5,146,500 | 9/1992 | Maurer | 380/30 |
| 5,159,632 | 10/1992 | Crandall . | |
| 5,271,061 | 12/1993 | Crandell | 380/30 X |
| 5,272,755 | 12/1993 | Miyaji et al. | 380/30 |
| 5,351,297 | 9/1994 | Miyaji et al. | 380/30 X |
| 5,442,707 | 8/1995 | Miyaji et al. | 380/30 |

*Primary Examiner*—Gilberto Barrón, Jr.
*Attorney, Agent, or Firm*—Price, Gess & Ubell

[57] ABSTRACT

The present invention provides a method of implementing digital signatures or verification and a privacy communication using the following: (1) choose a positive integer d such that gives an imaginary quadratic field $Q\{(-d)^{1/2}\}$ a small class number, and choose a prime number p such that is expressed by $2^t - \alpha$ (where $\alpha$ is a small number), such that either $p+1-a$ or $p+1+a$ is divisible by a prime number, and such that $4p - a^2 = d \cdot b^2$ to construct a finite field GF(p), or a definition filed of an elliptic curve, then construct an elliptic curve over the finite filed GF(p) having a root for a class polynomial $H_d(x)=0$ modulo GF(p) as j-invariant; (2) construct elliptic curves $E_1, E_2, \ldots, E_n$ in such a way that each will be not isomorphic but have a same number of elements to replace an elliptic curve one from the others.

64 Claims, 6 Drawing Sheets

| STEP | ITEMS | PARTIES | PARTICULARS |
|---|---|---|---|
| 1 | INITIAL SETTING | NETWORK PROVIDER | SELECTS E{GF(p)} AND BP |
| 2 | NOTICE (ELLIPTIC CURVE) | NETWORK PROVIDER | NOTIFIES ALL THE USERS OF E{GF(p)} AND BP |
| 3 | SELECTION | ALL USERS | SELECT A SECRET KEY d (USER V SELECTS dv) |
| 4 | CALCULATION | EACH USER | CALUCULATES A PUBRIC KEY Y (USER V.GETS $Y_v = d_v \cdot BP$) |
| 5 | NOTICE (PUBLIC KEY) | EACH USER | NOTIFIES HIS PUBLIC KEY TO USER U |
| 6 | PRIVACY COMMUNICATION (CIPHERED MESSAGE) | USER U | GENERATES A RANDOM NUMBER $r_u$ ENCIPHERS A MESSAGE M $C_1 = r_u \cdot BP$ $C_2 = M + x(r_u \cdot Y_v)$ TRANSMITS C1 AND C2 TO USER V |
| 7 | DECIPHERING | USER V | DECIPHERS THE CIPHERED MESSAGE $M = C_2 - x(d_v \cdot C_1)$ |

| STEP | ITEMS | PARTIES | PARTICULARS |
|---|---|---|---|
| 1 | INITIAL SETTING | NETWORK PROVIDER | SELECTS E{GF(p)} AND BP |
| 2 | NOTICE (ELLIPTIC CURVE) | NETWORK PROVIDER | NOTIFIES ALL THE USERS OF E{GF(p)} AND BP |
| 3 | SELECTION | ALL USERS | SELECT A SECRET KEY d (USER V SELECTS $d_v$) |
| 4 | CALCULATION | EACH USER | CALUCULATES A PUBRIC KEY Y (USER V.GETS $Y_v = d_v \cdot BP$) |
| 5 | NOTICE (PUBLIC KEY) | EACH USER | NOTIFIES HIS PUBLIC KEY TO USER U |
| 6 | PRIVACY COMMUNICATION (CIPHERED MESSAGE) | USER U | GENERATES A RANDOM NUMBER $r_u$ ENCIPHERS A MESSAGE M $C_1 = r_u \cdot BP$ $C_2 = M + x(r_u \cdot Y_v)$ TRANSMITS C1 AND C2 TO USER V |
| 7 | DECIPHERING | USER V | DECIPHERS THE CIPHERED MESSAGE $M = C_2 - x(d_v \cdot C_1)$ |

5,497,423

METHOD OF IMPLEMENTING ELLIPTIC CURVE CRYPTOSYSTEMS IN DIGITAL SIGNATURES OR VERIFICATION AND PRIVACY COMMUNICATION

BACKGROUND OF THE INVENTION (1) Field of the Invention

The present invention relates to cryptography as an information security technique, and more particularly, to elliptic curve cryptosystems.

(2) Description of the Related Art

In recent years, communication and pay-per-view television delivery via a public digital network have become popular. However, using a public network does not ensure security: the trouble of wiretapping and fraud by a third party and wrong data-transmission can not be eliminated completely. Given these circumstances, a digital signature or verification and a privacy communication have gained considerable importance. The privacy communication referred herein means a communication with an intended party without any information leakage, and the digital signature or verification referred herein means an authentication of the validity and a message sender to a receiver. The digital signatures or verification and private communication include a communication method called a public-key cryptosystem (PKC). The PKC facilitates the management of enciphering keys held in secret by each party, and thus it is an indispensable, basic technique in a cryptosystem where a plurality of parties are involved. In the following, the PKC's principle and procedure will be explained with its historical background.

(1) Privacy Communication Using DLP (Discrete Logarithm Problem) over Finite Field (Principle)

Let p be a prime number, g be one of p's primitive roots, u be an arbitrary natural number, and $\alpha$ be a residue of g to the u'th power modulo p, $g^u \equiv \alpha$ (mod p). Then, it is easy to find $\alpha$ with given g, p and u. However, it is quite difficult to find u using g, p and $\alpha$ even with a state-of-the-art massive computer if p is a prime number of about 140 digits. The same can be said in the following: it is easy to find the product of two prime numbers r and s, but it is quite difficult to find r and s from the product by factorization if r and s are prime numbers of about 140 digits; for the product is a number of about 280 digits.

Next, let v be another arbitrary natural number, $\beta$ be a residue of g to the v'th power modulo p, $g^v \equiv \beta$ (mod p). Here, a residue of $\alpha$ to the v'th power modulo p equals to a residue of $\beta$ to the u'th power modulo p.

$$\alpha^v \equiv (g^u)^v \equiv (g^v)^u \equiv \beta^u \text{ (mod p)}.$$

(Procedure)

Figure 1:
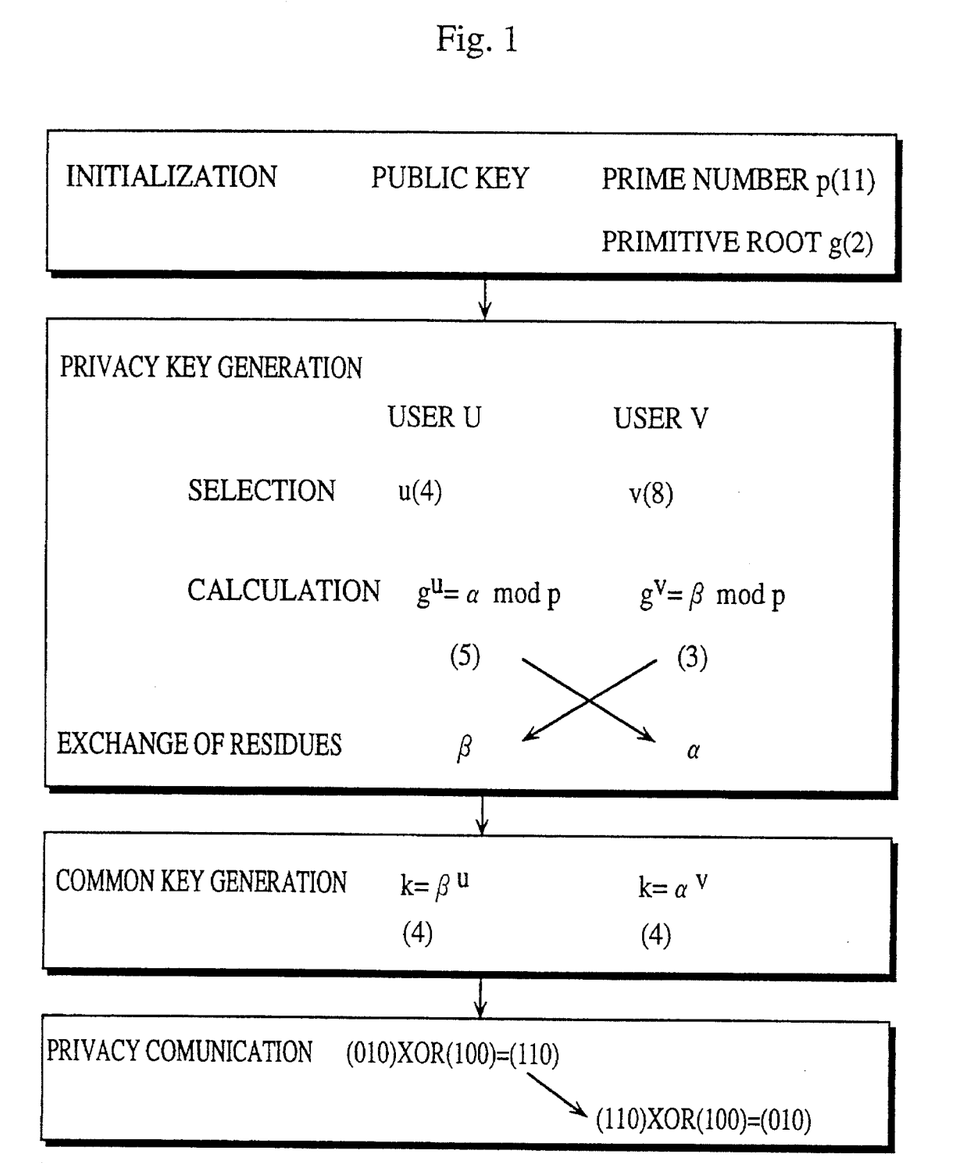
FIG. 1 is a view explaining a procedure for a privacy communication whose security depends on the DLP over a finite field.

In the following, a common key cryptosystem will be explained with referring to FIG. 1 as an example of the procedure of the privacy communication using the DLP over a finite field using the above principle.

A network provider notifies p and g to each user.

User U selects an arbitrary natural number u to compute $\alpha$ by an arithmetic operation of $g^u \equiv \alpha$ (mod p).

Likewise, User V selects v to compute $\beta$ by an arithmetic operation of $g^v \equiv \beta$ (mod p).

User U notifies $\alpha$ to User V via a public network while keeping u in secret, and User V notifies $\beta$ to user U via the public network while keeping v in secret.

Both users compute a residue $k_{uv}$ of $g^{uv}$ modulo p, which will be secretly used as a common key between themselves. Here, $k_{uv} \equiv g^{uv}$ (mod p).

The above procedure will be explained more specifically by using a small prime number as an example for the use of convenience.

Now, let p=11, g=2, and let User U select 4 as u, then $g^u=2^4=16$ and since a reside of 16 modulo 11 is 5, $\alpha=5$. Likewise, let User V select 8 as v, then $g^v=2^8=256$ and since a residue of 256 modulo 11 is 3, $\beta=3$. Further, since a residue of both $\alpha^v=5^8$ and $\beta^u=3^4$ modulo 11 is 4 (mod 11), $k_{uv}=4$.

When sending a message, or bit information, to User V, User U enciphers the message by dividing the same into a plurality of sets of a certain number of bits, and by performing an arithmetic operation with $k_{uv}$ for each set.

Let the message be (010). $k_{uv}=4$, this is expressed as (100) in the binary system. For this reason, if the arithmetic operation is an exclusive OR, then the message is enciphered as {(010) XOR (100)=} (110).

Then, User U sends the enciphered message to User V.

Upon the receipt of the enciphered message, User V deciphers the same using $k_{uv}$ to obtain the original message.

If User V receives (110) as the enciphered message, the enciphered message is deciphered as {(110) XOR (100)=} (010).

Note that the arithmetic operation can be addition, subtraction, and logic calculus per bit in the binary system.

The security of the foregoing common key cryptosystem depends on that should a third party wiretap $\alpha$ and $\beta$ when Users U and V exchange the same, he can not find $k_{uv}$ unless he knows u or v.

Also, since $k_{uv}$ is known to only Users U and V, User V can identify User U as the message sender if he can authenticate the deciphered message.

The foregoing common key cryptosystem is advantageous in that it can be applied to a communication where a plurality of users are involved. Other users W, X, etc. can join the privacy communication by selecting their natural numbers w, x, . . . , respectively. For example, User W can communicate with User U by using a reside of $g^{uw}$ modulo p as the common key.

Further, each of Users U, V, W can regularly replace their respective natural numbers u, v, w, . . . , etc. with other natural numbers u', v', w', . . . , etc. respectively, or specific User U can select other natural numbers $u_1, u_2, \ldots$ , etc. for each communication party. For this reason, if the forgoing common key cryptosystem is employed in a corporation's internal network system, it can be easily updated to an organization restructuring.

Note that, in practice, a product of a plurality of sufficiently large prime numbers p, q, r, . . . or p to the second or third power may be used instead of the prime number p, and the primitive root g may be replaced with a natural number whose order is sufficiently large.

However, parallel with the advancement in the field of computer technology, the mathematical logic has developed a variety of methods to find u using g, p, and $\alpha$ with a relatively small amount of computation.

One of the counter methods that uses the prime number p of about 200 digits instead of the prime number p of about 30 digits has been proposed. However, this method is not favorable because the absolute amount for various required computations may increase in proportional to the digit numbers.

Given these circumstances, the privacy communication using the EDLP (Discrete Logarithm Problem on an Elliptic Curve) has been proposed, which will be explained in the following.

(2) Privacy Communication Using EDLP

The EDLP, which is discussed in "A Course in Number Theory and Cryptography", Neal Koblitz, Springer-Verlag, 1987, will be explained.

(Elliptic Curve and Arithmetic Operation on Elliptic Curve)

An elliptic curve is an abelian manifold, or a projective algebraic curve with an irreducible and a non-singular genus 1 given by, for example, $$Y^2 = X^3 + aX + b.$$

Figure 2:
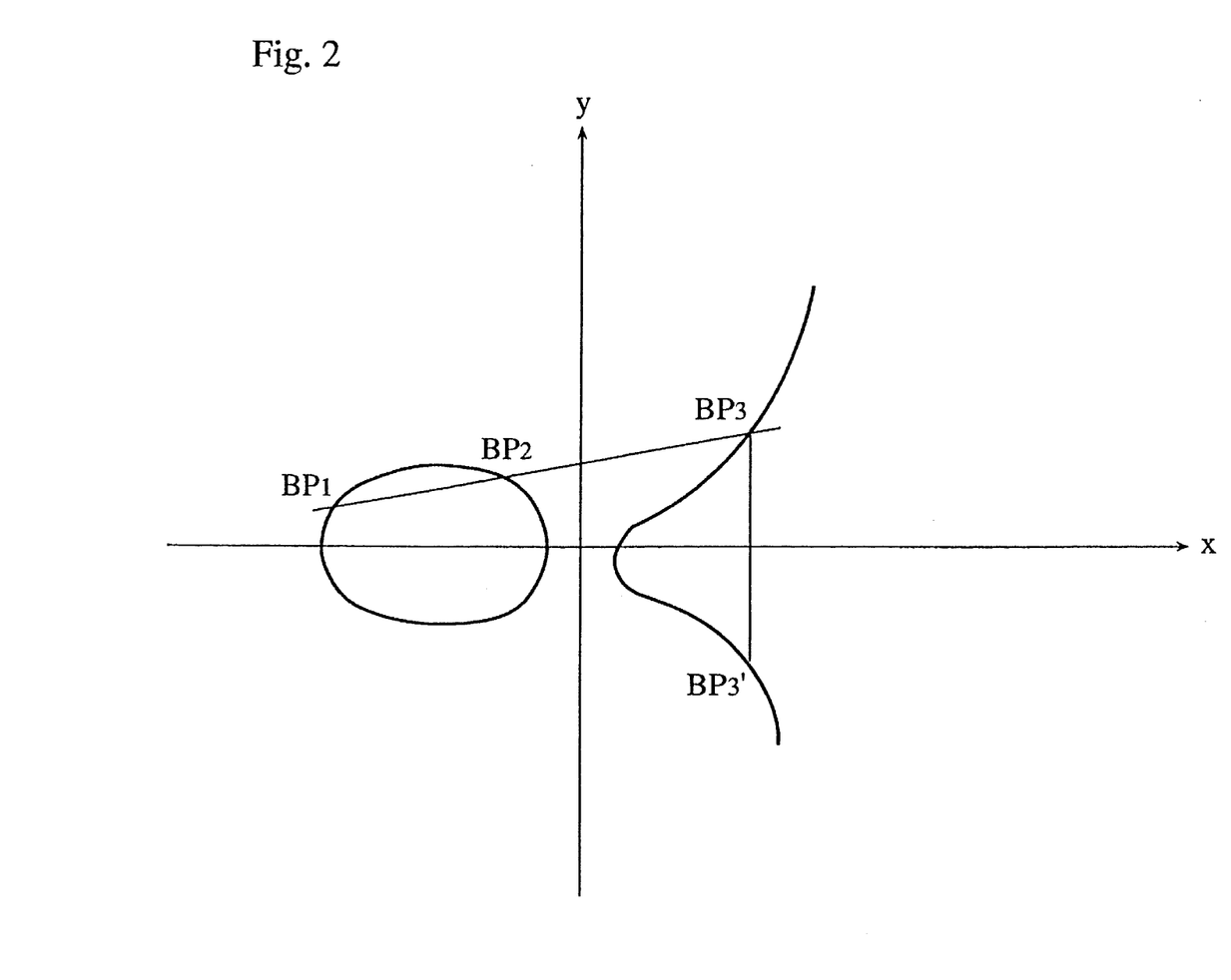
FIG. 2 is a view showing an arithmetic operation on an elliptic curve.

Now, let $BP_1$ and $BP_2$ be points on the elliptic curve, then an arithmetic operation $BP_1+BP_2$ can be defined as follows:

Let $BP_3'$ be a symmetric point to $BP_3$ with respect to an x-axis, and $BP_3$ be an intersection of the elliptic curve and a straight line passing both $BP_1$ and $BP_2$, then $BP_3'$ is $BP_1+BP_2$, which is shown in FIG. 2. If $BP_1=BP_2$, then the straight line passing $BP_1$ and $BP_2$ is a tangential line at $BP_1$.

Let E be the elliptic curve, then it is $E\{GF(q)\}$ that is used for the encryption; here, q is a power of a prime number, $GF(q)$ is a finite field (Galois Field), and $E\{GF(q)\}$ is a group of elements over $GF(q)$ on the elliptic curve E.

For example, let the elliptic curve E be given by $y^2=x^3+3x+2$, and $q=5$, then $E\{GF(q)\}$ is a set of five elements: (1, 1), (1, −1), (2, 1), (2, −1) and a point at infinity.

(Principle)

Next, the properties of $E\{GF(q)\}$, or the principle of the basis of the privacy communication, will be explained.

Let an element BP of $E\{GF(q)\}$ be a basepoint such that whose order is divisible by a large prime number, and d be an arbitrary natural number. Then it is easy to find d·BP using BP and d (add BP d times), but it is by no means easy even with a state-of-the-art computer to solve a following problem if BP or q etc. is a natural number of about 30 digits: given an elements BP and Q of $E\{GF(q)\}$, find a natural number d such that Q=d·BP, if such a natural number d exists. Here, BP plays a role of g over the finite field $GF(q)$ modulo p.

(Procedure)

The procedure is substantially the same as the above case over the finite field.

In other words, the aforementioned p corresponds to $E\{GF(q)\}$, g to BP, u or v to d, and an arithmetic operation, such as finding a residue of g to the u'th power modulo p, is performed over $E\{GF(q)\}$ instead of $GF(p)$.

Note that each point on the elliptic curve is given two-dimensional coordinates (x, y) whereas the message is one dimension. For this reason, one of the x- and y-coordinates is used in accordance with a prior agreement between the users. Thus, the procedure is different in that data are additionally transmitted for each transmission to make it possible to determine which coordinate was used, etc. (3) Current Development on Privacy Communication Using EDLP In 1991, a method to solve the EDLP relatively easily by reducing the same to the DLP was proposed, although any other sub-exponential method has not been proposed yet. With the sub-exponential method, a typical EDLP over a definition field of about 100 bits can be easily solved. This method proposed in 1991 is called MOV reduction and discussed in "Reducing Elliptic Curve Logarithm to Logarithms in a Finite Field", A. Menezes, S. Vanstone, T. Okamoto, STOC 91. In the MOV reduction, let q be a power of a prime number, E be an elliptic curve defined over the finite field $GF(q)$, and $E\{GF(q)\}$ be a group of elements over $GF(q)$ on E. Then, the EDLP having $BP \in E\{GF(q)\}$ as its base is reduced to the DLP over an extensive $GF(q^r)$ of the finite field $GF(q)$ when the order of BP and q are relatively prime; in particular, the discrete logarithm problem on a super singular elliptic curve can be solved by being reduced to the DLP over an extensive at most $GF(q^6)$ of the finite field $GF(q)$.

Accordingly, methods to construct an irreducible elliptic curve to the MOV reduction have been proposed. A variety of these methods have been proposed, and they are discussed in, for example, "Non-Supersingualr Elliptic Curves for Public Key Cryptosystems", T. Beth, F. Schaefer, Eurocrypt 91, 1991, or "On ordinary elliptic curve cryptosystems", Atsuko Miyaji, Abstract of Asiacrypt '91., etc. Since there has been proposed no solution such that gives a sub-exponential algorithm, the EDLP, which is as secure as the DLP over a finite field, can be constructed over a considerably small definition field by these methods.

However, only using a smaller definition field does not increase the operation speed much, because one elliptic curve addition requires twelve or thirteen multiplications. In other words, let $BP_1$ and $BP_2$ be expressed as $(x_1, y_1)$ and $(x_2, y_2)$, then $BP_1+BP_2=\{f_1(x_1, y_1, x_2, Y_2), f_2(x_1, Y_1, x_2, Y_2)\}$, where $f_1$ and $f_2$ are functions for twelve or thirteen computations over $GF(p)$. Thus, a method to speed up the operation has been developed together with the method to avoid the MOV reduction, which will be explained in the following.

(4) Method to Increase Operation Speed of Elliptic Curve Cryptosystem

One of the methods to increase the operation speed in the elliptic curve cryptosystem is discussed in "CM-curves with good cryptographic properties", N. Koblits, Crypro'91, 1991.

Figure 3:
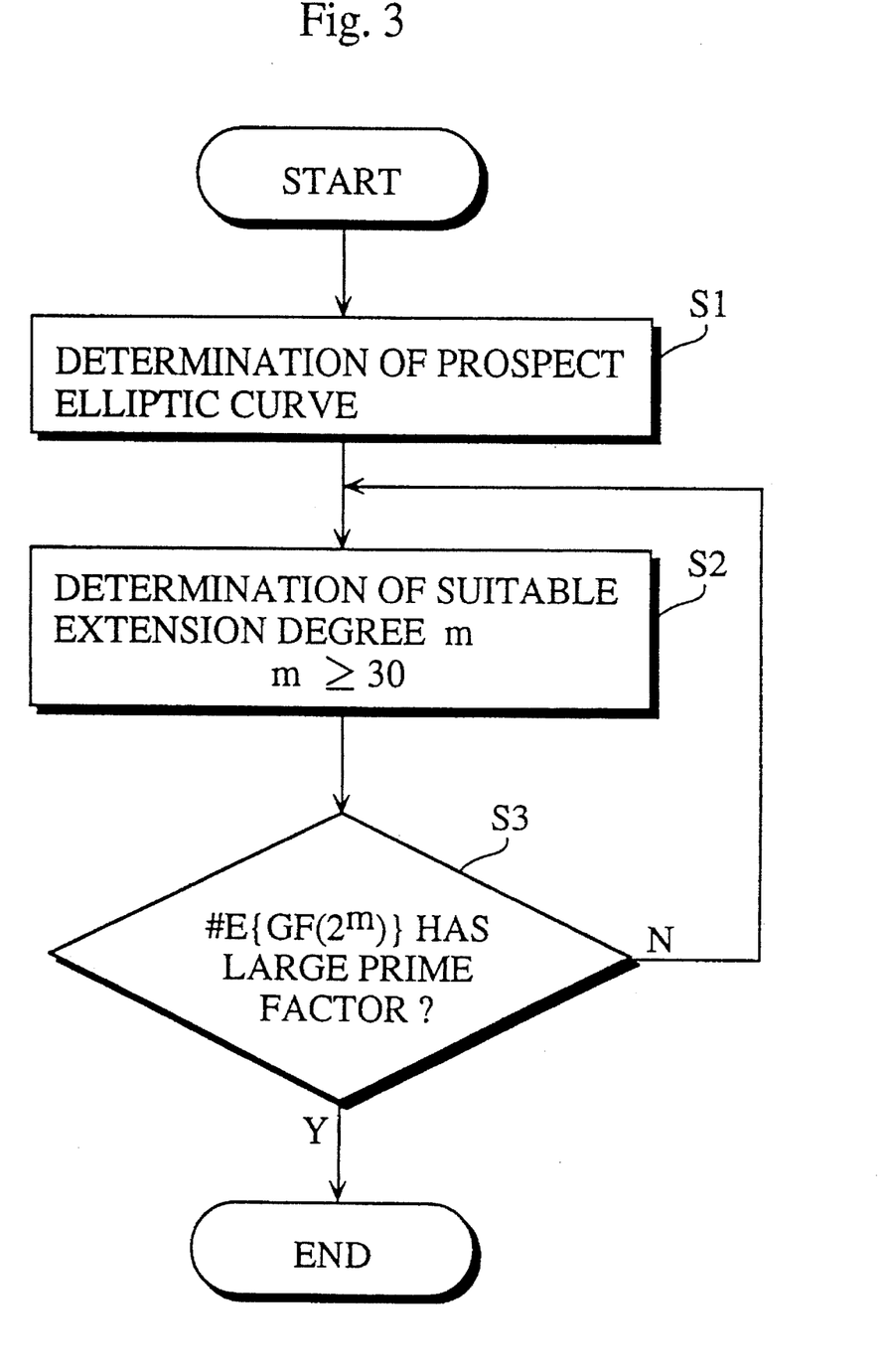
FIG. 3 is a flowchart detailing a procedure of finding an elliptic curve.

FIG. 3 shows a brief procedure for constructing an elliptic curve that speeds up the conventional methods of generating digital signatures or verification and privacy communication.

In the following, the conventional procedure will be explained with referring to FIG. 3.

(S1) Determination of Prospective Elliptic Curve

Choose two anomalous elliptic curves having GF(2) as the definition field.

$$E_1 \cdot y^2 + xy = x^3 + x^2 + 1$$

$$E_2 \cdot y^2 + xy = x^3 + 1$$

The group $E\{GF(2^m)\}$ consisting of the elements over $GF(2^m)$ on the elliptic curve E is as follows:

$$E_1\{GF(2^m)\} = \{x, y \in GF(2^m) \mid y^2 + xy = x^3 + x^2 + 1\} \cup \{\infty\}$$

$$E_2\{GF(2^m)\} = \{x, y \in GF(2^m) \mid y^2 + xy = x^3 + 1\} \cup \{\infty\}$$

where $\infty$ is an infinite point.

(S2) Determination of Suitable Extension Degree m.

As has been stated, it is known that the EDLP, on which the security of the PKC is based, is easily solved unless the order of the element BP, or the basepoint, has a large prime factor.

A necessary and sufficient condition for the element BP to have a large prime factor as its order is that the number of the elements of $E\{GF(q)\}$ has a large prime factor.

Thus, for the elliptic curve $E_i$ described in (S1), m such that the number of elements, $\#E_i\{GF(2^m)\}$, is divisible by a large prime factor is found. Here i=1, 2.

Note that given a specific m, etc, the number of elements on various types of elliptic curves such as $E\{GF(2^m)\}$ can be computed more precisely due to the researches by Hasse and Due. For example, the above mentioned $\#E_i\{GF(2^m)\}$ has an order of about $2^m$.

(S3) Construction of Elliptic Curve

To have the prime factor of 30 or more digits means that m is about [30 log$_2$ 10], where [ ] denotes Gauss'notation. With some of such m's found by trial-and-error, whether or not $\#E_i\{GF(2^m)\}$ has a prime factor of 30 or more digits is examined based on a formula that gives $\#E_i\{GF(2^m)\}$. Finding the number of elements of the group $E_i\{GF(2^m)\}$ consisting of the elements on the elliptic curve $E_i\{GF(2^m)\}$ and factorizing the same yields:

*if* $m=101$, then $\#E_1\{GF(2^m)\}=2\times p_1$

*if* $m=131$, then $\#E_2\{GF(2^m)\}=4\times p_2$ where $p_1$ and $P_2$ are prime numbers. Also, it can be confirmed that the finite filed embedded by the MOV reduction is sufficiently large.

Thus, it can be concluded that the PKC can be constructed if it is based on the EDLP having $E_2\{GF(2^{131})\}$ with the basepoint BP whose order has exactly $P_2$, or the EDLP having $E_i\{GF(2^{101})\}$ with the basepoint BP whose order has exactly $p_1$.

Now, with the anomalous, if T is a map to $E(x^2, y^2)$ from $E(x, y)$; then [2] (two times)=$T-T^2$, which is discussed in "The arithmetic of elliptic curves", J. H. Silverman, Springer-Verlag, 1986. In other words, if BP=(x, y), then $2BP=(T-T^2)$ (x, y)=(x, y)-(x$^2$, y$^2$). Thus, with the elliptic curve constructed in this way, $2^k BP = \{BP=(x, y); k=1, 2, 3, 4\}$ can be computed as follows:

$$2BP = BP + BP$$
$$4BP = 2(T-T^2) = -T^3 - T^2$$
$$= -(x^{2^3}, y^{2^3}) - (x^{2^2}, y^{2^2})$$
$$8BP = (-T^3 - T^2)(T-T^2)$$
$$= -(x^{2^3}, y^{2^3}) + (x^{2^5}, y^{2^5})$$
$$16BP = (T^3 + T^2)^2 = T^6 + 2T^5 + T^4$$
$$= 2T^6 - T^7 + T^4$$
$$= T^4 - T^8$$
$$= (x^{2^4}, y^{2^4}) - (x^{2^8}, y^{2^8})$$

where the superscript 2^3 and the like denote $2^3$ etc.

In case of the arithmetic operation over an extension of GF(2), the computation by a second power is realized by a cyclic shift when a normalized base is used as a base, so that the operation speed can be neglected when it is realized by a hardware. Accordingly, $2^k BP$ (k=1, 2, 3, 4) is realized by two elliptic curve additions, and the operation speed increases. In case of $E_2$ particularly, the normalized base over the definition field GF($2^{131}$) is an optimal normalized base, and the number of times for ANDs and exclusive ORs necessary for one multiplication is minimized. As a result, the basic arithmetic operation (multiplications over a finite field) can be performed faster. The optimal normalized base referred herein is a number whose number of terms of multiplicative function has $2^m-1$. For further information, see "Optimal Normal bases in GF(p$^a$)", R. C. Mullin et al, Discrete Applied Mathematics 22, pp. 149–161.

(5) Problems with Conventional Elliptic Curve to Increase Operation Speed

However, the above method does not speed up one elliptic curve addition. Therefore, to further increase the speed, it is necessary to find an elliptic curve satisfying the condition to speed up the arithmetic operation (the finite field GF($2^m$) having an optimal normalized base} and the condition for an elliptic curve that is secure and simplifies $2^i$-fold point (i=1, 2, 3, 4) (anomalous elliptic curve whose number of elements is divisible by a large prime number). However, there are only a handful of such elliptic curves; for these two conditions are not implicated each other.

(6) Other Method to Speed-up Elliptic Curve (Addition Chain)

The addition chain is proposed as one of the methods to increase the computation speed of kBP on the elliptic curve. In the addition chain, for example, 7BP is not found by simply adding BP seven times, but it is found by 2(2(2BP)–BP, one subtraction which is the same computation amount as an addition and three doublings; this is an invention of an addition method and will be studied along with the addition chain in the computation over a finite field $g^k$. This study relates to an invention of a pre-computation table and computation sequence, which are discussed in "Some algorithms on addition chains and their complexity", M. J. Coster, Center for Mathematics and Computer Science Report CS-R9024. Compared with the above-method that simplifies $2^i$-fold point (i=1, 2, 3, 4), the addition chain is faster for the computation of k·BP.

(Finite Field)

In addition, various methods to speed up the cryptosystem using the finite field have been proposed as well. However, since a finite field is used, these methods are impossible without using a large definition field in the privacy communication to ensure the security, which is discussed in "Discrete logarithm in GF(p) using the number field sieve" D. M. Gordon, to appear in SIAM Journal on Discrete Math.

(7) Current Problem with Elliptic Curve

There is a need for a high-speed operation for the PKC whose security depends on the EDLP. In case of the first conventional method, where only c·BP for a specific natural number c is sped up, it is difficult to increase the speed by combining the addition chain when k·BP for a general natural number k is to be sped up. Also, if an elliptic curve such that satisfies the condition to speed up c·BP for the specific c and the condition to speed up the basic arithmetic operation is constructed, a definition field becomes larger. Thus, it is a problem for the digital signature or verification and private communication to construct an elliptic curve such that uses a small definition field and speeds up the arithmetic operation of k·BP for the general natural number, and such that is easily combined with the addition chain and speeds up the basic arithmetic operation.

To further ensure the security, a possibility that security degradation in one system jeopardizes the entire system such as transactions based on the privacy communication, or a possibility that the security of one system happens to be degraded must be maintained small. For this reason, it is desirable to replace cryptosystem parameters regularly for each communication party, transmission purpose, etc., or within one cryptosystem. Note that this must be done in such a manner that minimizes the amount of change and maintains the same performance efficiency (speed and memory size, etc.). This corresponds to the regular replacement of p over a finite field, which has been described in the above.

However, in the above conventional methods, since an elliptic curve over GF(2) is extended to GF($2^m$), it is difficult to construct an elliptic curve that does not change the system performance. Thus, it is a problem for the digital signature or verification and private communication to construct an elliptic curve such that facilities the cryptosystem parameter replacement either for each system or within one system at any time when the replacement is required while minimizing an amount of change such as memory size, and enables high-speed arithmetic operation.

Further, in the above cases, it is a problem that there is a condition that the MOV reduction can not be applied to the elliptic curve.

SUMMARY OF THE INVENTION

The present invention has an object to solve the problems in the conventional cryptosystem. For this reason, the present invention has an object to provide a method of implementing digital signatures or verification and a privacy communication whose security depends on the EDLP by constructing an elliptic curve and a basepoint that maintain high security, and enable a high-speed operation without enlarging a definition field, and that easily apply the addition chain method to speed up the operation.

Further, the present invention has another object to provide a method of implementing digital signatures or verification and a privacy communication whose security depends on the EDLP by changing the elliptic curves easily without changing the parameters used for the basic arithmetic operation, which determine the operation speed and memory size of the cryptosystem.

The above objects can be fulfilled by a method of implementing a privacy communication comprising following procedures:

(1) a network provider provides E{GF(p)} and a basepoint BP to be used for the privacy communication to each user;

(2) each user who received E{GF(p)} and the basepoint BP selects an arbitrary natural number to find a value by adding the basepoint BP the selected natural number of times on E{GF(p)};

(3) each user keeps his arbitrary selected natural number in secret, while notifying the value obtained by adding the BP the natural number of times on E{GF(p)} as his public key to a user to whom he would like to send a message;

(4) two users, who are to communicate, find a value by adding the public key their respective natural number of times on E{GF(p)} as a common key;

(5) the two users make an agreement on a method of arithmetic operation for the public key and the message to encipher and decipher the message using the common key;

(6) one of the two users enciphers the message in accordance with the agreement using the common key to send an enciphered message to the other user; and (7) the other user, upon the receipt of the enciphered message, deciphers the enciphered message in accordance with the agreement using the common key, wherein {E(GF(p)} is defined as follows:
let d be a positive integer such that gives an imaginary quadratic field $Q\{(-d)^{1/2}\}$ a small class number;
let p be a prime number such that a prime factor of $4 \times p - a^2$ is d× square number where a is an integer, such that one of $p+1-a$ and $p+1+a$ is divisible by a prime number of 30 or more digits, and such that is expressed as $2^t \pm \alpha$, where t is a positive integer and $\alpha$ is a small positive integer;
then an elliptic curve E has a finite field GF(p) as a definition field which has a solution modulo p for a class polynomial $H_D(x)=0$ which is determined by d as a j-invariant.

Also, let E{GF(p)} be a group of elements over GF(p) on the elliptic curve E having the finite field GF(p) as the definition field, then the number of elements of E{GF(p)} may be divisible by a large prime number of 30 or more digits.

The positive integer $\alpha$ may be 2t/3 or less bit.

Also, let p be a prime number and r be a positive integer, and $E\{GF(p^r)\}$ be a group of elements over $GF(p^r)$ on an elliptic curve E having a finite field $GF(p^r)$ as a definition field, then elliptic curves $E_1, E_2, \ldots, E_n$ may be constructed in such a way that each will have the finite field $GF(p^r)$ as the field of definition and each will be not isomorphic but have a same number of elements to be used for at least one of an individual system, each communication party, and a same communication party within one system in every certain period of time.

Also, let n be a degree of the class polynomial $H_d(x)=0$ determined by d, and $j_1, \ldots, j_n$ be a solution modulo p, then the elliptic curve E may be the elliptic curve $E_1, \ldots, E_n$ having the finite field GF(p) as the definition field having for $j_1, \ldots, j_n$ as the j-invariant.

In the arithmetic operation to encipher and decipher the message using the common key in accordance with the agreement, properties of one of $2^t \equiv \alpha$ (mod p) and $2^t \equiv -\alpha$ (mod p) and an addition chain may be used.

The above objects can be fulfilled by a method of implementing a privacy communication comprising following procedures:

(1) a network provider provides E{GF(p)} and a basepoint BP to be used for the privacy communication to each user;

(2) each user who received E{GF(p)} and the basepoint BP selects an arbitrary natural number to find a value by adding the basepoint BP the selected natural number of times on E{GF(p )};

(3) each user keeps his arbitrary selected natural number in secret, while notifying the value obtained by adding the BP the natural number of times on E{GF(p)} as his public key to a user to whom he would like to send a message;

(4) two users make an agreement on a method of arithmetic operation for the public key, a random number, and a message to encipher and decipher the message using the notified common key and the random number;

(5) one of the two users who received the public key enciphers the message in accordance with the agreement based on a ransom number he selected and the public key notified by the other user;

(6) the one of the users sends an enciphered message to the other user who notified the public key; and (7) the other user deciphers the message enciphered in accordance with the agreement using his integer selected and kept in secret upon receipt of the enciphered message, wherein {E{GF(p)} is defined as follows:
let d be a positive integer such that gives an imaginary quadratic field $Q\{(-d)^{1/2}\}$ a small class number;
let p be a prime number such that a prime factor of $4 \times p - a^2$ is d×square number where a is an integer, such that one of $p+1-a$ and $p+1+a$ is divisible by a prime number of 30 or more digits, and such that is expressed as $2^t \pm \alpha$, where t is a positive integer and $\alpha$ is a small positive integer;
then an elliptic curve E has a finite field GF(p) as a definition field which has a solution modulo p for a class polynomial $H_d(x)=0$ which is determined by d as a j-invariant.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

FIRST EMBODIMENT

Figure 4A:
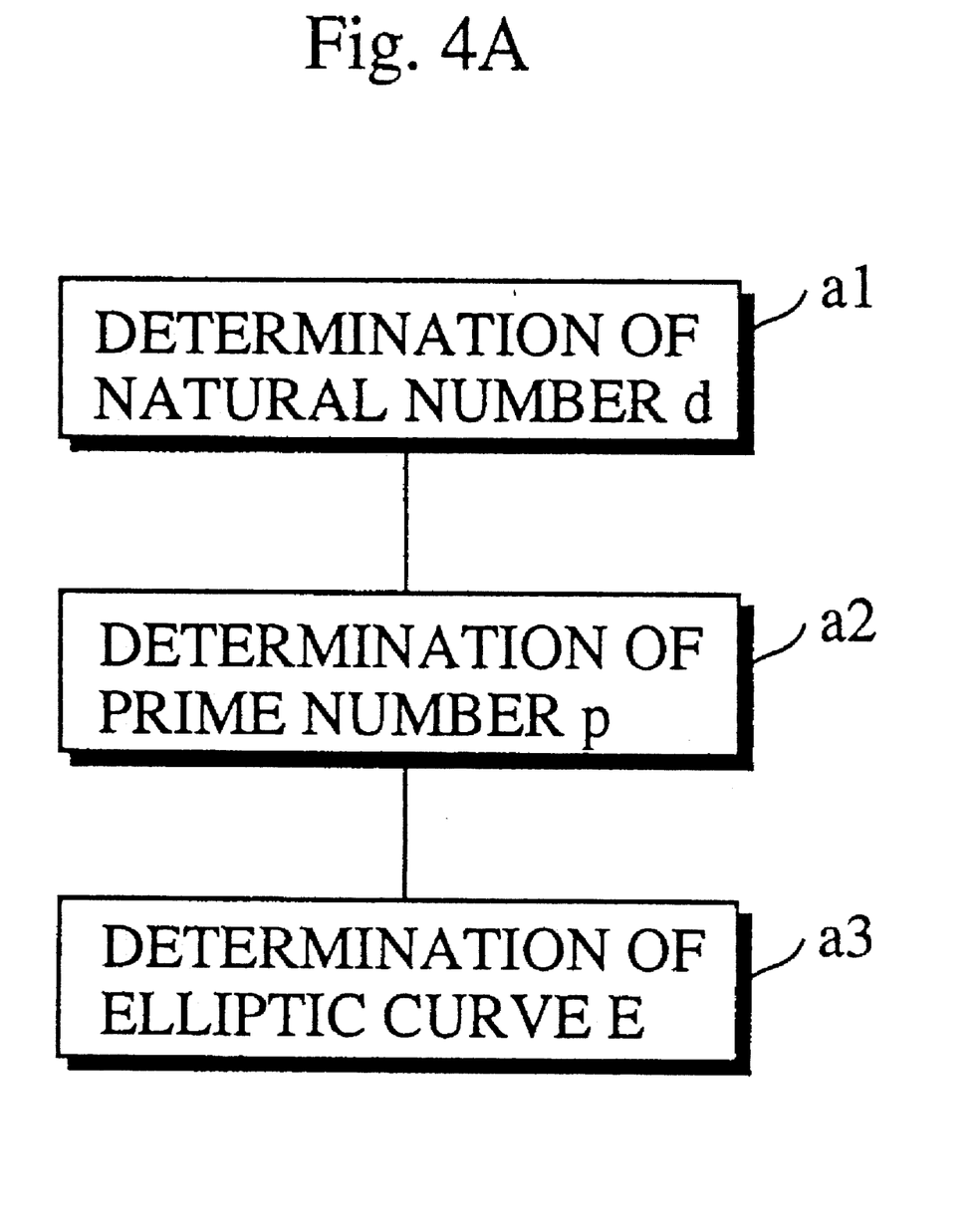
FIGS. 4A and 4B are flowcharts to construct an elliptic curve used for the digital signature or verification and privacy communication of the present invention.
Figure 4B:
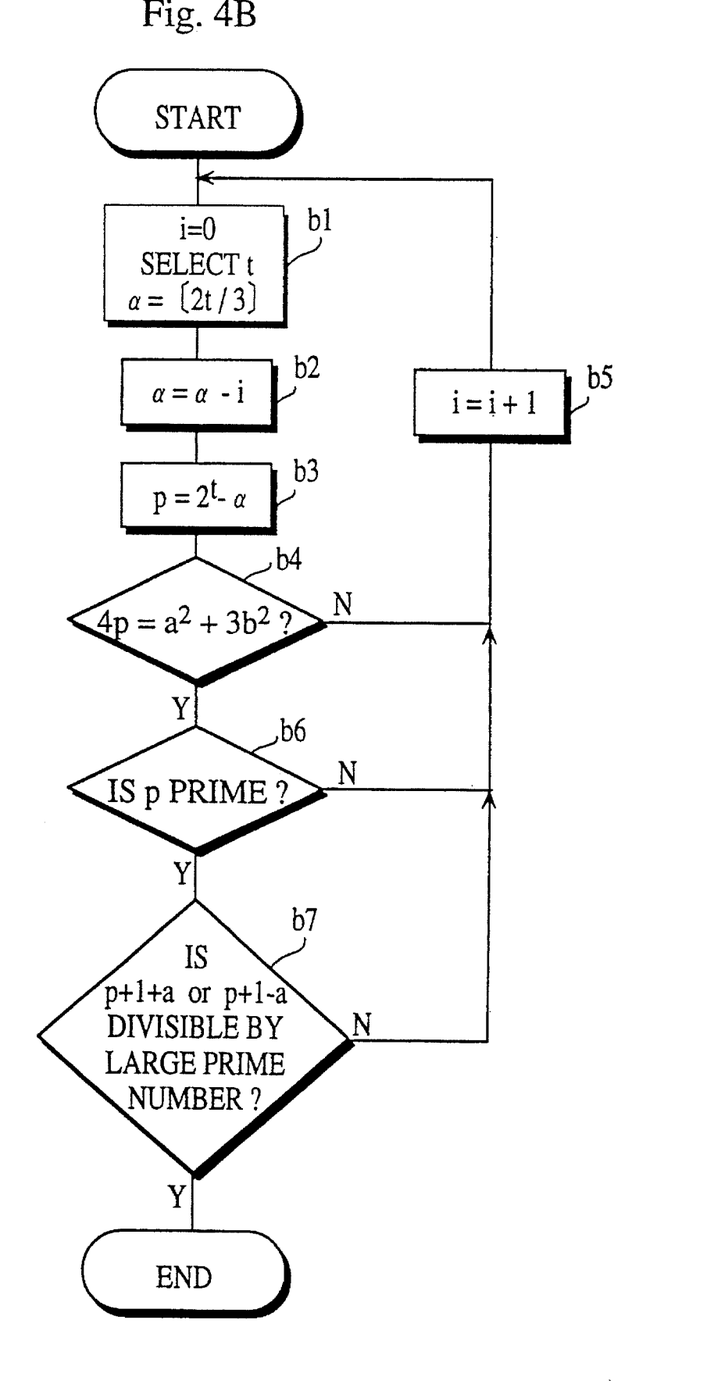

A procedure for constructing an elliptic curve used for the digital signature or verification and privacy communication of the present invention is detailed by the flowcharts in FIGS. 4A and 4B; FIG. 4A is a general flow and FIG. 4B is a subchart thereof, detailing the step of determining a prime number p.

In the following, the procedure of the embodiment will be explained with referring to FIGS. 4A and 4B.

(a1) Determination of a natural number d

Choose a natural number d such that gives an imaginary quadratic field $Q\{(-d)^{1/2}\}$ a small class number. Let d=3 here, because it facilitates the computation of finding p, which will be described later. For further information of the imaginary quadratic field $Q\{(-d)^{1/2}\}$ and the class number, see the aforementioned Silverman's book.

(a2) Generation of Prime Number p

Choose a prime number p such that $4p-a^2=d \times b^2$, such that p+1−a or p+1+a is divisible by a large prime number, where a and b are natural numbers, and such that is expressed as $2^t-\alpha$, where t is a natural number and $\alpha$ is a small natural number.

This selection procedure is done by trial-and-error and will be described more in detail with referring to FIG. 4B.

Prior to the detailed explanation, the mathematical logic relative to a possibility to realize this step will be explained briefly.

(1) An equation, $4p=a^2+d \times b^2$ is known as a special form of Pell's equation; once p is given, a and b such that satisfy this equation can be easily found by an expansion into continued fraction.

(2) The theorem of prime numbers proves that there exists one prime number in every log n for a natural number n.

Thus, it can be understood that one of every 100 natural numbers of about 30 digits expressed by $2^t-\alpha$ is a prime number. Since the multiples of small prime numbers 2, 3, 5, etc. can be easily removed, a probability for being a prime number further increases. Thus, whether a natural number expressed by $2^t-\alpha$ is a prime number and is not a multiple of small prime numbers 2, 3, 5, etc. can be confirmed easier using today's advanced computers and by the mathematic theory (Miller, Cohen, and Lenstra).

(3) Most of the natural numbers include about log log n prime factors (Hardy and Ramanujan). Thus, if p is a number of about 30 digits, p+1−a or p+1+a typically has 4–7 prime factors. Therefore, in most of the cases, it is easy to determine whether p+1−a or p+1+a includes a sufficiently large prime factor or not. Of course, whether the natural number is a prime number or not can be confirmed as well.

Now, with referring to FIG. 4B, the method of selecting p, a, $\alpha$, t will be explained more specifically.

To begin with, t is chosen first, and then i is set to 0(i=0) and $\alpha$ is set to [2t/3] ($\alpha$=[2t/3]).

Next, $\alpha$ is set to $\alpha-i$ (b2).

$p=2^t-\alpha$ is computed (b3). Whether 4p is expressed as $a^2+3b^2$ or not is determined (b4). If not, the flow proceeds to Step b5, where i is changed to i+1 (i=i+1), to return to Step b2.

If 4p is expressed as $a^2+3b^2$, whether p is a prime number or not is determined (b6). If not, the flow returns to Step b5.

If p is a prime number, whether either p+1−a or p+1+a includes a large prime factor or not is determined (b7). If not, the flow returns to Step b5.

If either p+1−a or p+1+a is divisible by a large prime factor, the flow ends.

Here, $p=2^t-\alpha$, t=107, $\alpha$=1, a=24 38789 23037 40815

Then, p+1+a is divisible by a prime number of 100 bits.

(a3) Determination of Elliptic Curve E

E can be found based on a root j=0 of a class polynomial $H_3(X)=X$ modulo p. The mathematical aspect for this is explained in the aforementioned Silverman's book.

The elliptic curve E having the finite field GF(p) as the definition field whose number of elements is exactly p+1+a will have a value 0 as a j-invariant. Thus, E can be given by:

$$E: y^2 = x^3 + B$$

$$B = 625$$

Hence, #E{GF(p)}=p+1+a. This is also explained in the aforementioned Silverman's book. Thus, a secured, high-speed elliptic curve cryptosystem can be constructed.

When the elliptic curve E thus constructed is applied to the second conventional digital signature or verification and privacy communication, the order of the basepoint BP is divisible by a large prime number and the resulting EDLP can avoid the MOV reduction, thereby realizing a secured cryptosystem.

Further, the multiplication of GF(p), which is one of the basic arithmetic operation required to realize the above cryptosystem, can be re-written as $2^t=\alpha$. Hence, it can be realized without finding a residue modulo p as follows:

$$\text{for } GF(p) \; x = \sum_{i=0}^{t-1} x_i 2^i, \; y = \sum_{i=0}^{t-1} y_i 2^i$$

$$x \times y = \sum_{i=0}^{2t-1} s_i 2^i = \sum_{i=0}^{t-1} (s_i + s_{i+t} \alpha) 2^i$$

where $s_i$ and $s_{i+t}$ are either 1 or 0.

Further, the computation speed can be increased not only for c·BP for the specific natural number c as was in the conventional cryptosystem. Thus, by combining the addition chain, which speeds up the computation of k·BP for the general natural number k, the speed further increases. Also, as to the amount of data, since t and $\alpha$ can be stored into a smart card used for a signal processing instead of p as the data of the definition field, and t's bit number is negligible and $\alpha$ is less than [2t/3] bit, the amount of data of the definition field can be reduced. This contributes to speeding up the arithmetic operation.

In the above embodiment, 3 is given to the natural number d to facilitate the computation in finding the prime number p and to give a small class number (herein 1) to the imaginary quadratic field $Q\{(-d)^{1/2}\}$. However, any natural number such that gives the imaginary quadratic field $Q\{(-d)^{1/2}\}$ a small class number can be used. A small class number is given to the imaginary quadratic field $Q\{(-d)^{1/2}\}$ to facilitate the arithmetic operation to construct the elliptic curve, and the class number is not limited to 1. Note that if d<1000, the arithmetic operation can be implemented. Also, there are eight natural numbers for d besides 3 such that generates an imaginary quadratic field whose class number is 1, and they are: 1, 2, 7, 11, 19, 43, 67, and 163. In addition, d such that generates an imaginary quadratic field whose class number is 2 can be: 10, 15, 26, 30 etc. However, not all of these natural numbers are applicable to the present invention. Also, the prime number p such that satisfies the condition for d is not limited to the above embodiment. Note that any prime number p such that satisfies the condition for p described in this embodiment can be used. If p is a prime number of 30 or more digits, the difficulty of the reverse arithmetic operation will be maintained, or the security can be ensured, for a considerable period in the near future.

SECOND EMBODIMENT

Another method for constructing an elliptic curve used for the digital signatures or verification and privacy communication of the present invention will be explained hereunder. The procedure is substantially the same as the one shown in FIGS. 4A and 4B. The procedure will be explained with referring to FIG. 4A again.

(a1) Determination of a natural number d

Choose a natural number d such that gives the imaginary quadratic field $Q\{(-d)^{1/2}\}$ a small class number. Let d=24 herein.

(a2) Generation of a Prime Number p

Choose a prime number p such that satisfies $4p-a^2=24 \times b^2$, such that p+1−a or p+1+a is divisible by a large prime number, where a and b are natural numbers, and such that is expressed by $2^t-\alpha$, where t is a natural number and $\alpha$ is a small natural number.

Here, $p=2^t-\alpha$ t=127

$\alpha=1$ a=10671 93179 31455 45219

Then, p+1−a is divisible by a prime number of 124 bits.

Note that the detailed procedure is substantially the same as FIG. 4B.

(a3) Determination of Elliptic Curve E

A root for a class polynomial $H_{24}(X)=X^2-4834944X+139392$ modulo p is found as follows:

$J_1$=3 14934 62074 25766 39325 56096

$J_2$=1701 41183 46043 77382 69613 04605 19563 84575

The elliptic curve E having the finite field GF(p) as the definition field and whose number of elements is exactly p+1−a will have $j_1$ and $j_2$ as a j-invariant. Thus, the elliptic curves having $j_1$ and $j_2$ respectively as the j-invariant can be given by:

$E_1: y^2=x^3+A_1x+B$ $A_1$=915 03150 65123 53429 89289 36723 21130 54488

$B_1$=1177 15828 25431 33059 03422 01272 67034 04901

$E_2: y^2=x^3+A_2x+B$ $A_2$=1400 68790 50479 08325 24538 34292 93927 22673

$B_2$=366 65585 84970 41444 39129 79404 76337 79873

Here, $\#E_1\{GF(p)\}=\#E_2\{GF(p)\}=p+1-a$. However, they are not isomorphic because their j-invariant are different. For this reason, should the cryptosystem based on the EDLP with $E_1$ be deciphered, the cryptosystem based on the EDLP with $E_2$ remains secure.

To further ensure the security, it is preferable to replace the cryptosystem parameters regularly either for each system or within one system. The parameters are replaced easily if they use the same basic arithmetic operation (arithmetic operation of p of the definition field and arithmetic operation modulo N, where N is the number of the elements on the elliptic curve). The elliptic curves $E_1$ and $E_2$ constructed as above can provide different cryptosystems, in other words, different cryptography, using the identical but not isomorphic basic arithmetic operation. Therefore, by separately using the elliptic curves $E_1$ and $E_2$ for different systems, or replacing one from the other within one system, can further ensure the security of the cryptosystem. Further, the multiplication over GF(p), which is one of the basic arithmetic operation required to realize the system, can be realized faster than a multiplication over a general finite field since given p is the form of $p=2^t\pm\alpha$. Also, the operation speed can be increased not only for the computation of c·BP for the specific natural number c as was in the conventional cryptosystem. Thus, by easily combining the addition chain, which speeds up the computation of k·BP for the general natural number k, the operation speed can further increase. In addition, since only t and $\alpha$ are stored instead of p as the data of the definition field, the amount of data of the definition field can be reduced.

Note that 24 is given to a positive integer d in this embodiment; however, d can be any positive integer such that gives the imaginary quadratic field $Q\{(-d)^{1/2}\}$ a small class number. Also, note that p such that satisfies the condition for the prime number p is not limited to the above embodiment; p can be any prime number such that satisfies the above-described condition for p, and the rest is the same as the first embodiment.

Next, the embodiments of the digital signature or verification based on the EDLP using the elliptic curves constructed in the first and second embodiments will be explained.

THIRD EMBODIMENT

The third embodiment provides a common key cryptosystem using the elliptic curve constructed in the first embodiment. Thus, the procedure is substantially the same as the conventional common key cryptosystem based on the DLP.

In other words, a network provider notifies $E\{GF(q)\}$ and BP to all the users, and Users U, V, W . . . select their respective natural numbers u, v, w, . . . and hold the same in secret. Then, each of Users U, V, W, . . . exchange u·BP, v·BP, w·BP, . . . with each other.

Each of arbitrary two users finds the product of their respective secret natural numbers and the value notified from the other to generate the common key. For example, in case of communication between User U and User V, User U computes the product of his secret number u and v·BP notified from V (u·v·BP): likewise, User V computes v·u·BP using v and u·BP. Here, naturally u·v·BP=v·u·BP. Both hold u·v·BP in secret.

In this case, a message is a one-dimensional value whereas the product is a two-dimensional value including x, y-coordinates. Thus, only one of the x-coordinate value and y-coordinate value is used to encipher or decipher the message, and 1-bit data C(u·v·BP) are additionally transmitted to notify which value was used. Since p≡3 (mod 4) in the first embodiment, the following properties are used:

x(u·v·BP) and 1-bit C(u·v·BP) which recover y(u·v·BP), and x(u·v·BP) and 1-bit of y(u·v·BP) of the basepoint BP are used as public data with the following algorithm:

$$(x^3+ax+b)^{p-1}=1$$

and when p=4×s+3, where s is a natural number, $$y_4=(x^3+ax+b)^2=(x^3+ax+b)^{4s+2}\times(x^3+ax+b)^2$$

thus, $$y=\pm(x^3+ax+b)^{s+1}$$

therefore, $$y=(x^3+ax+b)^{s+1}$$

where C(u·v·BP)=1, and $$y=-(x^3+ax+b)^{s+1}$$

where C(u·v·BP)=−1.

Note that multiplication must be repeated to recover with C(u·v·BP) in this algorithm.

FOURTH EMBODIMENT

In this embodiment, the present invention is applied to the digital signature or identification: User U wishing to transmit a message to User V does so by way of User W, a third party who plays a role of the network provider in the third embodiment.

To begin with, User W calculates two elliptic curves $E_1$ and $E_2$ constructed in the second embodiment.

User W selects two basepoints $BP_u$, $BP_v$; the former is an element other than the zero element of $E_1\{GF(p)\}$, and the latter is that of $E_2\{GF(p)\}$. Then, User W notifies $E_1$, $\{GF(p)\}$ and the basepoint $BP_u$ to User U alone, and $E_2$, $\{GF(p)\}$ and the basepoint $BP_v$ to User V alone.

In the mean time, User U selects an arbitrary integer $d_u$ in secret and generates $Y_u$ (his identification data to User W) defined by:

$$Y_u=d_u\cdot BP_u$$

Subsequently, User W selects an arbitrary integer $d_{uw}$ in secret and generates $Y_{uw}$ (his identification data to User U) defined by:

$$Y_{uw}=d_{uw}\cdot BP_u$$

Then, Users U, W exchange $Y_u$ and $Y_{uw}$ to make a common key $K_{uw}$ defined by:

$$K_{uw}=d_u\cdot Y_{uw}=d_{uw}\cdot Y_u$$

User U enciphers a message M using the common key as an enciphering key and transmits the enciphered message to User W alone, whereas the user W deciphers the enciphered message using the common key as a deciphering key. In general, the message is enciphered/deciphered by a block cipher method such as DES (Data Encryption Standard), but this can be done with Exclusive-OR of the common key as well. On the other hand, User V selects an arbitrary integer $d_v$ in secret, and generates $Y_v$ (his identification data to User W) defined by:

$$Y_v=d_v\cdot BP_v$$

Subsequently, User W selects an arbitrary integer $d_{vw}$ in secret, and generates $Y_{vw}$ (his identification data to User V defined by:

$$Y_{vw}=d_{vw}\cdot BP_v$$

Then, Users V, W exchange $Y_v$ and $Y_{vw}$ to make a common key $K_{vw}$ defined by:

$$K_{vw}=d_{vw}\cdot Y_v=d_v Y_{vw}$$

User W enciphers the message M received from User U using the common key as an enciphering key and transmits the enciphered message to User V alone, whereas User V deciphers the enciphered message using the common key as a deciphering key. The message is enciphered/deciphered by the block cipher method in general, but this can be done with Exclusive-NOR as well. Thus, the message M is transmitted in secret from User U to User V by way of User W.

Different elliptic curves are used in the communication between Users U, W, and between Users V, W to prevent User V from receiving, by any chance, the communication between Users U, W and vice versa.

Two elliptic curves $E_1$, $E_2$ are used to further ensure the security. However by so doing, there will be other benefits. For example, User W can share a residue operation routine because the arithmetic operation for p of the definition field and the arithmetic operation modulo N (N is the number of elements of the elliptic curve) are identical.

FIFTH EMBODIMENT

In this embodiment the elliptic curves constructed in the second embodiment are applied to the digital signature or identification.

Figure 5:
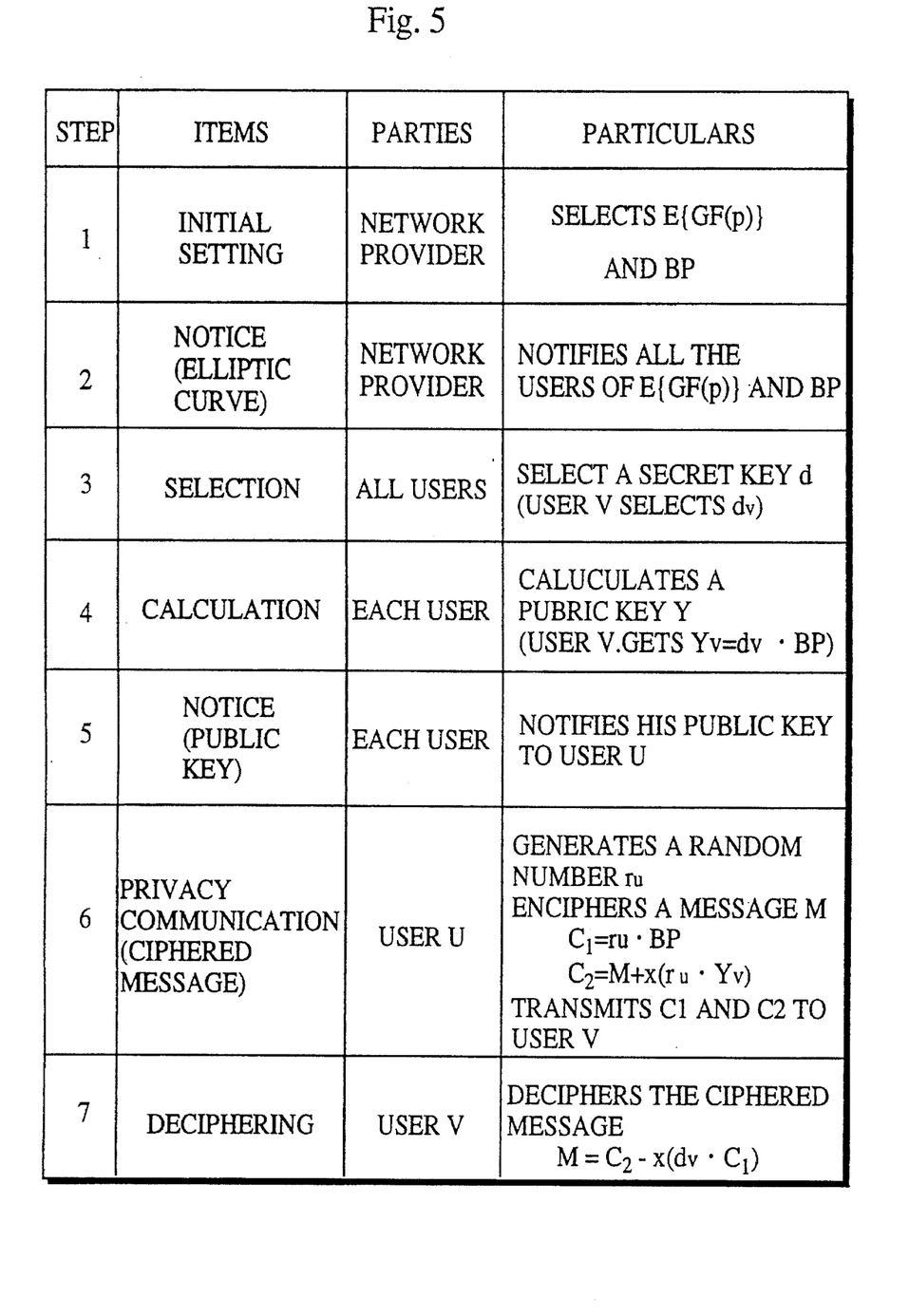
FIG. 5 is a view explaining an example of a procedure of enciphering and deciphering a message transmitted via the privacy communication using the elliptic curve used for the digital signature or verification and privacy communication of the present invention.

Users U, V are two parties who wish to communicate via a network N, and take the following steps summarized in FIG. 5.

In Step 1, a network provider calculates $E_1$ and $E_2$ defined over GF(p) and BP as was explained in the second embodiment.

In Step 2, the network provider notifies $E\{GF(p)\}$ and BP to all the users connected to the network N.

In Step 3, both Users U, V select their respective arbitrary integers $d_u$ and $d_v$ in secret as their deciphering keys.

In Step 4, Users U and V calculate their respective public keys $Y_u$ and $Y_v$ over $E\{GF(p)\}$ using BP: $Y_u=d_u\cdot BP$, $Y_v=d_v\cdot BP$, and notify the same to all the other users.

Now, User U is to send a message M (plaintext) to User V, and selects a random integer $r_u$ in secret to encipher the message M using $r_u$ and $Y_v$ to send the enciphered message consisting of $C_1$ and $C_2$ as below to User V.

$$C_1 = r_u \cdot BP$$

$$C_2 = M + x(r_u \cdot Y_v)$$

where $x(r_u \cdot Y_v)$ is the x-coordinate of $r_u \cdot Y_v$.

Being the element of the elliptic curve E, $r_u Y_v$ is two-dimensional data expressed as $(r_x, r_y)$ in X-Y coordinate, whereas the message M is one-dimensional data. For this reason, only $r_x$ is used to generate $C_2$ according to a prior agreement made between Users U, V.

Accordingly, User V deciphers the enciphered message using $d_v$, which is strictly kept to himself, as follows:

$$M = C_2 - x(d_v \cdot C_1)$$

where $x(d_v C_1)$ is the x-coordinate of $d_v \cdot C_1$.

According to this method, User U can transmit the message M to User V in secret, and should User U erroneously transmit the enciphered message to an unintended user, there is no way for the unintended receiver to decipher the same, for the deciphering key $d_v$ is kept unknown to him.

Next, signal processing for the message M will be explained.

For each transmission, arithmetic operation such as $C_1 = r_u \cdot BP_1$, $C_2 = M + x(r_u \cdot Y_v)$, must be performed to encipher or decipher the random integer or message M.

The signals conveying the message M and the random number are expressed in "1's" and "0's" in the binary system. Thus, $2BP$, $2^2BP$, $2^3BP \ldots$, etc. are computed and stored into the smart card in advance. If $r_u$ is expressed as 1111 (=15) in the binary system, then $2BP$, $2^2BP$ and $2^3BP$ are read out to be added to BP in general. However, to increase the computation speed, other methods are used in this embodiment, such as reading $2^4BP$ to compute $r_u \cdot BP = 2^4BP - BP$.

Also, the addition chain described in the related art column is also applicable depending on the value.

A small natural number d and a small class number are used to facilitate the program or computation for finding a prime number or an elliptic curve. However, if the present invention is applied to where a higher security is required, such as financial transaction or secret diplomacy, d can be a large number, such as about 10000, 50000, 100000, albeit with a corresponding cost increase.

Further, a logical operation is used to keep the number of digits of the binary signal small for the encryption etc of the message using the arithmetic operation with BP on the elliptic curve; however, other operations are applicable as well. In addition, a random number can be used based on the agreement between the sender and receiver, or the message can be divided into a plurality of blocks which are replaced with each other. In this case, the agreement on the random integer used and the method of block-division and the replacement must be made.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A method of implementing a privacy communication comprising following procedures:

(1) a network provider provides $E\{GF(p)\}$ and a basepoint BP to be used for the privacy communication to each user;

(2) each user who received $E\{GF(p)\}$ and the basepoint BP selects an arbitrary natural number to find a value by adding said basepoint BP the selected natural number of times on $E\{GF(p)\}$;

(3) each user keeps his arbitrary selected natural number in secret, while notifying the value obtained by adding the BP said natural number of times on $E\{GF(p)\}$ as his public key to a user to whom he would like to send a message;

(4) two users, who are to communicate, find a value by adding the public key their respective natural number of times on $E\{GF(p)\}$ as a common key;

(5) the two users make an agreement on a method of arithmetic operation for the public key and the message to encipher and decipher the message using the common key;

(6) one of the two users enciphers the message in accordance with the agreement using the common key to send an enciphered message to the other user; and (7) the other user, upon the receipt of the enciphered message, deciphers the enciphered message in accordance with the agreement using the common key, wherein $\{E(GF(p))\}$ is defined as follows:

let d be a positive integer such that gives an imaginary quadratic field $Q\{(-d)^{1/2}\}$ a small class number;

let p be a prime number such that a prime factor of $4 \times p - a^2$ is d×square number where a is an integer, such that one of $p+1-a$ and $p+1+a$ is divisible by a prime number of 30 or more digits, and such that is expressed as $2^t \pm \alpha$, where t is a positive integer and $\alpha$ is a small positive integer;

then an elliptic curve E has a finite field GF(p) as a definition field which has a solution modulo p for a class polynomial $H_d(x) = 0$ which is determined by d as a j-invariant.

2. The method of claim 1, wherein let $E\{GF(p)\}$ be a group of elements over GF(p) on the elliptic curve E having the finite field GF(p) as the definition field, then the number of elements of $E\{GF(p)\}$ is divisible by a large prime number of 30 or more digits.

3. The method of claim 2, wherein the positive integer $\alpha$ is $2t/3$ or less bit.

4. The method of claim 3, wherein let p be a prime number and r be a positive integer, and $E\{GF(p^r)\}$ be a group of elements over $GF(p^r)$ on an elliptic curve E having a finite field $GF(p^r)$ as a definition field, then elliptic curves $E_1, E_2, \ldots, E_n$ are constructed in such a way that each will have the finite field $GF(p^r)$ as the field of definition and each will be not isomorphic but have a same number of elements to be used for at least one of an individual system, each communication party, and a same communication party within one system in every certain period of time.

5. The method of claim 4, wherein let n be a degree of the class polynomial $H_d(x) = 0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

6. The method of claim 5, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

7. The method of claim 4, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

8. The method of claim 3, wherein let n be a degree of the class polynomial $H_d(x) = 0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

9. The method of claim 8, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

10. The method of claim 3, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

11. The method of claim 2, wherein let p be a prime number and r be a positive integer, and $E\{GF(p^r)\}$ be a group of elements over $GF(p^r)$ on an elliptic curve E having a finite field $GF(p^r)$ as a definition field, then elliptic curves $E_1, E_2, \ldots, E_n$ are constructed in such a way that each will have the finite field $GF(p^r)$ as the field of definition and each will be not isomorphic but have a same number of elements to be used for at least one of an individual system, each communication party, and a same communication party within one system in every certain period of time.

12. The method of claim 11, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

13. The method of claim 12, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

14. The method of claim 11, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

15. The method of claim 2, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, jn$ as the j-invariant.

16. The method of claim 15, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

17. The method of claim 2, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

18. The method of claim 1, wherein the positive integer $\alpha$ is 2t/3 or less bit.

19. The method of claim 18, wherein let p be a prime number and r be a positive integer, and $E\{GF(p^r)\}$ be a group of elements over $GF(p^r)$ on an elliptic curve E having a finite field $GF(p^r)$ as a definition field, then elliptic curves $E_1, E_2, \ldots, E_n$ are constructed in such a way that each will have the finite field $GF(p^r)$ as the field of definition and each will be not isomorphic but have a same number of elements to be used for at least one of an individual system, each communication party, and a same communication party within one system in every certain period of time.

20. The method of claim 19, wherein let n be a degree of the class polynomial $H_d(x)=0$ determined by d, and $j_1, \ldots, j_n$ be a solution modulo p, then the elliptic curve E is the elliptic curve $E_1, \ldots, E_n$, having the finite field GF(p) as the definition field having for $j_1, \ldots, j_n$ as the j-invariant.

21. The method of claim 20, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

22. The method of claim 19, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

23. The method of claim 18, wherein let n be a degree of the class polynomial $H_d(x)=0$ determined by d, and $j_1, \ldots, j_n$ be a solution modulo p, then the elliptic curve E is the elliptic curve $E_1, \ldots,$ En having the finite field GF(p) as the definition field having for $j_1, \ldots, j_n$ as the j-invariant.

24. The method of claim 23, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

25. The method of claim 18, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

26. The method of claim 1, wherein let p be a prime number and r be a positive integer, and $E\{GF(p^r)\}$ be a group of elements over $GF(p^r)$ on an elliptic curve E having a finite field $GF(p^r)$ as a definition field, then elliptic curves $E_1, E_2, \ldots, E_n$ are constructed in such a way that each will have the finite field $GF(p^r)$ as the field of definition and each will be not isomorphic but have a same number of elements to be used for at least one of an individual system, each communication party, and a same communication party within one system in every certain period of time.

27. The method of claim 26, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

28. The method of claim 1, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

29. The method of claim 26, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

30. The method of claim 1, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

31. The method of claim 30, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

32. The method of claim 1, wherein in the arithmetic operation to encipher and decipher the message using the common key in accordance with the agreement, properties of one of $2^t \equiv \alpha$ (mod p) and $2^t \equiv -\alpha$ (mod p) and an addition chain are used.

33. A method of implementing a privacy communication comprising following procedures:

(1) a network provider provides E{GF(p)} and a basepoint BP to be used for the privacy communication to each user;

(2) each user who received E{GF(p)} and the basepoint BP selects an arbitrary natural number to find a value by adding said basepoint BP the selected natural number of times on E{GF(p)};

(3) each user keeps his arbitrary selected natural number in secret, while notifying the value obtained by adding the BP said natural number of times on E{GF(p)} as his public key to a user to whom he would like to send a message;

(4) two users make an agreement on a method of arithmetic operation for the public key, a random number, and a message to encipher and decipher the message using the notified common key and the random number;

(5) one of the two users who received the public key enciphers the message in accordance with the agreement based on a random number he selected and the public key notified by the other user;

(6) the one of the users sends an enciphered message to the other user who notified the public key; and (7) the other user deciphers the message enciphered in accordance with the agreement using his integer selected and kept in secret upon receipt of the enciphered message, wherein (E{GF(p)} is defined as follows:

let d be a positive integer such that gives an imaginary quadratic field $Q\{(-d)^{1/2}\}$ a small class number;

let p be a prime number such that a prime factor of $4 \times p - a^2$ is d×square number where a is an integer, such that one of p+1−a and p+1+a is divisible by a prime number of 30 or more digits, and such that is expressed as $2^t \pm \alpha$, where t is a positive integer and α is a small positive integer;

then an elliptic curve E has a finite field GF(p) as a definition field which has a solution modulo p for a class polynomial $H_d(x)=0$ which is determined by d as a j-invariant.

34. The method of claim 33, wherein let E{GF(p)} be a group of elements over GF(p) on the elliptic curve E having the finite field GF(p) as the definition field, then the number of elements of E{GF(p)} is divisible by a large prime number of 30 or more digits.

35. The method of claim 34, wherein the positive integer α is 2t/3 or less bit.

36. The method of claim 35, wherein let p be a prime number and r be a positive integer, and E{GF(p$^r$)} be a group of elements over GF(p$^r$) on an elliptic curve E having a finite field GF(p$^r$) as a definition field, then elliptic curves $E_1, E_2, \ldots, E_n$ are constructed in such a way that each will have the finite field GF(p$^r$) as the field of definition and each will be not isomorphic but have a same number of elements to be used for at least one of an individual system, each communication party, and a same communication party within one system in every certain period of time.

37. The method of claim 36, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

38. The method of claim 37, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

39. The method of claim 36, wherein in the arithmetic operation to encipher and decipher the message using the common key in accordance with the agreement, properties of one of $2^t \equiv \pmod{p}$ and $2^t \equiv -\alpha \pmod{p}$ and an addition chain are used.

40. The method of claim 35, wherein let n be a degree of the class polynomial $H_d(x)=0$ determined by d, and $j_1, \ldots, j_n$ be a solution modulo p, then the elliptic curve E is the elliptic-curve $E_1, \ldots, E_n$ having the finite field GF(p) as the definition field having for $j_1, \ldots, j_n$ as the j-invariant.

41. The method of claim 40, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

42. The method of claim 35, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

43. The method of claim 34, wherein let p be a prime number and r be a positive integer, and E{GF(p$^r$)} be a group of elements over GF(p$^r$) on an elliptic curve E having a finite field GF(p$^r$) as a definition field, then elliptic curves $E_1, E_2, \ldots, E_n$ are constructed in such a way that each will have the finite field GF(p$^r$) as the field of definition and each will be not isomorphic but have a same number of elements to be used for at least one of an individual system, each communication party, and a same communication party within one system in every certain period of time.

44. The method of claim 43, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

45. The method of claim 44, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

46. The method of claim 43, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

47. The method of claim 34, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field GF(p) as the definition field having for $j_1, \ldots, j_n$ as the j-invariant.

48. The method of claim 47, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

49. The method of claim 34, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

50. The method of claim 33, wherein the positive integer α is 2t/3 or less bit.

51. The method of claim 50, wherein let p be a prime number and r be a positive integer, and E{GF(p$^r$)} be a group of elements over $GF(p^r)$ on an elliptic curve E having a finite field $GF(p^r)$ as a definition field, then elliptic curves $E_1, E_2, \ldots, E_n$ are constructed in such a way that each will have the finite field $GF(p^r)$ as the field of definition and each will be not isomorphic but have a same number of elements to be used for at least one of an individual system, each communication party, and a same communication party within one system in every certain period of time.

52. The method of claim 51, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field $GF(p)$ as the definition field having for $j_1, \ldots, j_n$ as the j-invariant.

53. The method of claim 52, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

54. The method of claim 51, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

55. The method of claim 50, wherein let n be a degree of the class polynomial $H_d(x)=0$ determined by d, and $j_1, \ldots, j_n$ be a solution modulo p, then the elliptic curve E is the elliptic curve $E_1, \ldots, E_n$, having the finite field $GF(p)$ as the definition field having for $j_1, \ldots, j_n$ as the j-invariant.

56. The method of claim 55, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

57. The method of claim 50, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

58. The method of claim 33, wherein let p be a prime number and r be a positive integer, and $E\{GF(p^r)\}$ be a group of elements over $GF(p^r)$ on an elliptic curve E having a finite field $GF(p^r)$ as a definition field, then elliptic curves $E_1, E_2, \ldots, E_n$ are constructed in such a way that each will have the finite field $GF(p^r)$ as the field of definition and each will be not isomorphic but have a same number of elements to be used for at least one of an individual system, each communication party, and a same communication party within one system in every certain period of time.

59. The method of claim 58, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field $GF(p)$ as the definition field having for $j_1, \ldots, j_n$ as the j-invariant.

60. The method of claim 59, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

61. The method of claim 58, wherein in the arithmetic operation to encipher and decipher the message using the common key in accordance with the agreement, properties of one of $2^t \equiv \alpha \pmod{p}$ and $2^t \equiv -\alpha \pmod{p}$ and an addition chain are used.

62. The method of claim 33, wherein let n be a degree of the class polynomial $H_d(x)=0$ determined by d, and $j_1, \ldots, j_n$ be a solution modulo p, then the elliptic curve E is the elliptic curve $E_1, \ldots, E_n$ having the finite field $GF(p)$ as the definition field having for $j_1, \ldots, j_n$ as the j-invariant.

63. The method of claim 62, wherein in the arithmetic operation to encipher and decipher the message using the common key in accordance with the agreement, properties of one of $2^t \equiv \alpha \pmod{p}$ and $2^t \equiv \alpha \pmod{p}$ and an addition chain are used.

64. The method of claim 33, wherein in the arithmetic operation to encipher and decipher the message using the common key in accordance with the agreement, properties of one of $2^t \equiv \alpha \pmod{p}$ and $2^t \equiv \alpha \pmod{p}$ and an addition chain are used.

* * * * *